United States Patent Office 3,531,527
Patented Sept. 29, 1970

3,531,527
PROCESS FOR PREPARING AMINE-
TERMINATED POLYETHERS
Tsi Tieh Li, Milltown, Guido Mino, Murray Hill, and
Samuel Kaizerman, Somerville, N.J., assignors to
American Cyanamid Company, Stamford, Conn., a corporation of Maine
No Drawing. Continuation-in-part of application Ser. No.
596,800, Nov. 25, 1966. This application Mar. 10, 1969,
Ser. No. 805,834
Int. Cl. C07c 93/02
U.S. Cl. 260—584                                    10 Claims

ABSTRACT OF THE DISCLOSURE

Amine-terminated polyethers of the structure

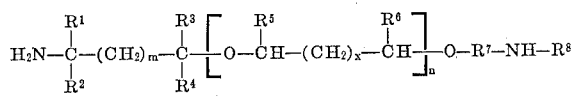

are prepared by (a) preparing an initiator complex by contacting a Lewis acid-type salt and a cyclic imine such as aziridine, (b) polymerizing an alkylene oxide in the presence of the initiator complex, and (c) terminating the polymerization by addition of an alkanolamine such as ethanolamine, wherein $R^1$, $R^2$, $R^3$ and $R^4$ individually are hydrogen or alkyl ($C_1$–$C_4$); $R^5$ and $R^6$ individually are hydrogen or alkyl ($C_1$–$C_4$); $R^7$ is alkylene ($C_2$–$C_6$); $R^8$ is hydrogen or alkyl ($C_1$–$C_6$); $x$ is 0–2; $m$ is 0–1; and $n$ is 5–100. The polyethers may be reacted with polyepoxides to form resinous products.

---

This application is a continuation-in-part of application Ser. No. 596,800 filed Nov. 25, 1966 now abandoned.

This invention relates to an improved method for the preparation of amine-terminated polyethers. More particularly, it relates to a method for the preparation of compounds of the general structure

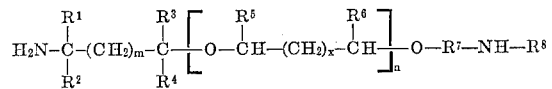

wherein $R^1$, $R^2$, $R^3$ and $R^4$ individually are hydrogen or alkyl ($C_1$–$C_4$); $R^5$ and $R^6$ individually are hydrogen or alkyl ($C_1$–$C_4$); $R^7$ is alkylene ($C_2$–$C_6$); $R^8$ is hydrogen or alkyl ($C_1$–$C_6$); $x$ is 0–2; $m$ is 0–1; and $n$ is 5–100. Preferably, the total number of carbon atoms in $R^1$, $R^2$, $R^3$ and $R^4$ does not exceed 4 and the total number of carbon atoms within the brackets [ ] does not exceed 4. The method of preparation in general terms comprises reacting a cyclic imine, an alkylene oxide, and an alkanolamine in the presence of those Lewis acids which are metal salts and an alkali metal alkoxide of said alkanolamine.

Several methods have been employed or suggested for use in the preparation of amine-terminated polyethers. One method is to react the hydroxyl-terminated polyether with benzenesulfonic acid and then react this intermediate with ammonia as in German Patent No. 1,131,404. Another is to react the hydroxyl-terminated polyether with acrylonitrile and subsequently reduce the β-cyanoethyl ether thus formed with hydrogen to the aminoether as disclosed by British Pat. No. 984,510. Still another is to react the hydroxyl-terminated polyether with ammonia in the presence of a Raney-type catalyst, for instance, as illustrated in French Pat. No. 1,377,429. None of these methods is completely satisfactory for one or more reasons including poor yields, inconvenient and difficult procedure, the requirement of elaborate equipment and expensive catalysts, problems in controlling the reaction so as to minimize side reactions, difficult separation of the desired product from the reaction mass, and the like. In addition, all of these processes involve separate preparation of the polyether and subsequent modification thereof to effect amine-termination, the combintaion of which further complicates obtaining the desired product. There exists, therefore, the need for an improved process for the preparation of amine-terminated polyethers which overcomes the difficulties of the former processes.

It has now been discovered that amine-terminated polyethers can be readily produced in high yields in convenient form directly by the reaction of a cyclic imine, an alkylene oxide, and an alkanolamine in the presence of a Lewis acid of the metal salt type and an alkali metal alkoxide of the alkanolamine. This result is surprising for several reasons. First, it is surprising in that polyether formation and amine-termination are produced concurrently instead of in sepaarte processes as in former methods of preparation. Second, it is surprising in that the desired product can only be obtained with selected starting materials and catalysts and does not form in other cases. It is also surprising that the molecular weight of the product and the distribution thereof can readily be controlled in the preparative procedure despite the nature of the reactants.

The amine-terminated polyethers obtained according to the process of this invention are useful intermediates in the preparation of plastic compositions of many types. They may, for example, be reacted with polyepoxides to produce tough rubbery molded articles having a variety of uses wherein advantage is taken of their special properties. A specific utility is that shown in French Pat. No. 1,377,429.

The process of the invention comprises three essential steps: (1) initiator preparation, (2) polymerization and (3) termination.

In the first step, a metal salt complex of a cyclic imine is formed by reaction in a suitable solvent with the exclusion of air or oxygen. This is conveniently carried out in a closed reactor equipped with agitator and a gas inlet tube. To the metal salt in the reactor is added the aziridine with stirring and the reaction is conducted under a blanket of inert gas with external cooling. The metal salts are those also known as Lewis acids as defined and exemplified in G. A. Olah, "Friedel-Crafts and Related Reactions," vol. I, Interscience Publishing Co., New York (1963). Particularly good results are obtained with antimony salts such as the following pentahalides: antimony pentachloride, antimony pentafluoride, antimony pentabromide.

The cyclic imines for use in the first step include those of the following structure:

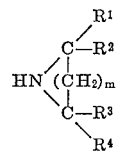

wherein $m$ and the R groups are as defined above. The 2,2,3,3-tetra-alkyl aziridines may be prepared by the process described in J. Am. Chem. Soc., 82, 6088–70 (1960). Particularly good results are obtained with aziridine, 2-methylaziridine, 2-ethylaziridine, and 2,2-dimethylaziridine. Trimethylenimine and similar compounds may also be employed. As far as is known no other compound type is equivalent to the cyclic imines in this reaction. The ratio of metal salt to cyclic imine may vary but it is preferred to employ stoichiometric equivalents of each. The solvents employed should be inert and include diethyl ether, ethyl isopropyl ether, methylene chloride or other halogenated hydrocarbons and the like. Among the inert gases that may be used as blanketing agents are included nitrogen, helium, argon, and the like. The reaction temperature may range from −100 to 0° C., but preferably is about −70° C. which is readily obtained with Dry Ice-acetone mixtures. Complex formation is rapid and requires no extended time period for completion. When solution is complete the next step addition may be performed.

In the second step an alkylene oxide, which has previously been cooled to 0 to 10° C., is added. Polymerization begins immediately. The polymerization is allowed to continue at a somewhat higher temperature until the desired molecular weight is obtained. Among the alkylene oxides that may be employed are included ethylene oxide, 1,2-propylene oxide, 1,3-propylene oxide, 1,4-butylene oxide, and others of the following structure, as well as mixtures thereof wherein $R^5$, $R^6$ and $x$ are as defined above:

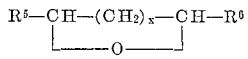

The amount of alkylene oxide added relative to the amount of metal salt complex initially employed may be varied widely depending upon the molecular weight desired in the final amine-terminated polyether. Generally, the higher the ratio of alkylene oxide to metal salt complex, the higher will be the molecular weight of the polymer. The temperature of the polymerization reaction may also vary widely, but generally is in the range of about 0 to 25° C. by replacing the Dry Ice-acetone bath with cold water. The time of polymerization will vary depending upon the temperature of the reaction, the ratio of alkylene oxide to metal salt complex, and the molecular weight desired in the polymer. From about 8 to about 12 hours have been found convenient. It is desirable to maintain the reaction mixture under a blanket of inert gas. The reaction mixture at this point is a viscous liquid.

In the third step the reaction mixture is added to an alkanolamine containing previously added alkali metal in an amount sufficient to react with only a portion of the alkanolamine to form the alkali metal alcoholate (alkoxide) thereof. The reaction mixture is added slowly while maintaining vigorous agitation and a blanket of inert gas. The temperature is maintained between about 15 to 40° C. during this addition and reaction by means of a cold water bath.

Among the alkanolamines that may be employed are included ethanolamine, 2-propanolamine, 3-propanolamine, N-methyl ethanolamine and others of the structure

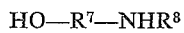

where $R^7$ and $R^8$ are as defined above. As far as is known, there is no compound type equivalent to the alkanolamines. The amount of alkanolamine required is the stoichiometric quantity necessary to react with the growing polymer chain but may be greatly in excess of the requirements for amine-termination and may vary from about 50 to 150% of the equivalent amount of alkylene oxide employed, preferably 75 to 100% on the same basis, the excess being useful as a solvent and diluent. The amount of alkali metal employed is in the range of from about 5 to about 50% of the stoichiometric requirements of the alkanolamine, preferably about 25 to 35% of such requirements. Among the useful alkali metals are lithium, sodium and potassium. Particularly good results are obtained with sodium. The reaction time required for the amine-termination will vary depending upon the variable previously cited. From about 2 to 3 hours is convenient.

The reaction is followed by conventional precipitation and separation procedures. Thus, the reaction mixture is drowned in an ice-water mixture while maintaining high-speed, high-shear stirring, resulting in precipitation of the product in a finely divided state. The product is then washed, separated, and dried. The amount of ice-water mixture employed may vary widely as in typical drowning procedures. From about 5 to about 10 parts ice-water mixture per part of reaction mixture is convenient. Among the high-speed, high-shear agitators that may be employed are included Waring Blendors, Eppenbach Mixers, and the like. The product is washed to neutralization. Any convenient means may be employed for separation such as filtration, centrifugation, decantation, and the like. Drying may be at ambient or elevated temperatures.

The invention is more fully illustrated by the examples which follow which are not necessarily limitative. All parts and percentages are by weight unless otherwise indicated.

EXAMPLE 1

Into a suitably equipped reactor was placed 17.4 parts (0.058 moles) of antimony pentachloride. The reactor was cooled in a Dry Ice-acetone bath to about −70° C. and a blanket of nitrogen was maintained in the reactor. A solution of 2.5 parts (0.058) of aziridine dissolved in 3 parts of diethyl ether was added dropwise into the flask with rapid stirring. Alternatively, the diethyl ether may be added first, followed by the aziridine. From a supply of 1,4-butylene oxide which had been cooled to 0–10° C. there was taken 100 parts (1.38 moles) which was added rapidly to the reactor with stirring and nitrogen blanket maintained. Polymerization began immediately as evidenced by viscosity increase. The Dry Ice-acetone bath was removed and replaced with a cold water bath. The polymerization was continued for about 12 hours at 0–25° C. The viscous solution resulting was then transferred into a second reactor containing sodium-2-amino-ethoxide solution. This solution was prepared by dissolving 10 parts of metallic sodium chips in 85 parts of 2-aminoethanol. The transfer was made slowly while maintaining the blanket of nitrogen and vigorous agitation. The temperature was maintained at 20–35° C. with cold water. After about 2 hours, the solution was poured into a Waring Blendor which contained 1500 parts of an ice-water mixture. A fine powder was obtained which was washed with water until neutral and separated by filtration. The product was dried at 70° C. in an oven circulating hot air. A waxy solid in 70% yield was obtained. The product had 0.71% basic amino-end groups, as determined by titration in anhydrous acetic acid solution with a solution of perchloric acid using α-naphtholbenzene as indicator. The molecular weight as determined by end group acetylation as well as by N analysis was approximately 4500.

EXAMPLES 2–5

Following the procedure of Example 1 but with the following substitutions, similar polymers of like properties are obtained.

Example 2—12.5 parts of antimony pentafluoride for the antimony chloride in Example 1.

Example 3—4.1 parts of 2,2-dimethyl aziridine for the aziridine in Example 1.

Example 4—4.1 parts of 2-ethyl aziridine for the aziridine in Example 1.

Example 5—3.3 parts of 2-methyl aziridine for the aziridine in Example 1.

EXAMPLE 6

Antimony pentachloride, 210 grams in 170 milliliters of methylene chloride, was stirred under nitrogen and cooled to −78° C. To this solution was added dropwise 36 milliliters of ethylenimine diluted with 120 milliliters diethyl ether. The addition required 1.5 hours.

1,4-butylene oxide, 1200 grams (dry), cooled to −10° C. was then added and the reaction mixture held at 5–20° C. for 15 hours. Excess 1,4-butylene oxide was removed in vacuo at 25° C. and the resulting polymer terminated with the sodium salt of N-methyl ethanolamine at 30–35° C. (The sodium salt was prepared by dissolving 110 grams of sodium in 1 liter of N-methyl ethanolamine at 70° C.) There was obtained 465 grams of polymer having the following analyses:

Percent amine (by amine titration): 1.05, 1.04
Molecular weight based on percent amine: 2700
Acetyl No.: 41.18, 41.06
Molecular weight based on acetyl No.: 2720

We claim:
1. A process for preparing an amine-terminated polyether of the structure

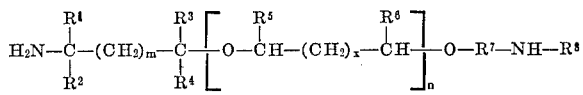

which comprises (a) reacting at −100° C. to 0° C. a Lewis acid-type metal salt and a cyclic imine of the structure

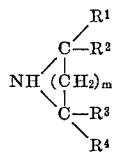

(b) reacting the complex resulting from step (a) and an alkylene oxide of the structure

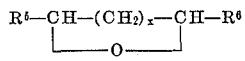

under conditions of temperature and reaction time effective to polymerize said alkylene oxide, and (c) reacting at about 15° C. to 40° C. the reaction mixture resulting from step (b) and an alkali metal alkoxide of an alkanolamine of the structure

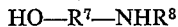

wherein $R^1$, $R^2$, $R^3$ and $R^4$ individually are hydrogen or alkyl ($C_1$–$C_4$); $R^5$ and $R^6$ individually are hydrogen or alkyl ($C_1$–$C_4$); $R^7$ is alkylene ($C_2$–$C_6$); $R^8$ is hydrogen or alkyl ($C_1$–$C_6$); $x$ is 0–2; $m$ is 0–1; and $n$ is 5–100.

2. The process of claim 1 wherein said metal salt of step (a) is an antimony pentahalide.
3. The process of claim 1 wherein said cyclic imine is aziridine.
4. The process of claim 1 wherein said alkanolamine is ethanolamine.
5. The process of claim 1 wherein said alkanolamine is N-methyl ethanolamine.
6. The process of claim 1 wherein said alkylene oxide is 1,4-butylene oxide.
7. The process of claim 1 wherein said metal salt of step (a) is antimony pentachloride and the process is conducted in an inert atmosphere.
8. The process of claim 1 wherein said metal salt of step (a) is antimony pentachloride, said cyclic imine is aziridine, said alkanolamine is ethanolamine and said alkylene oxide is 1,4-butylene oxide.
9. The process of claim 1 wherein the reaction mixture resulting from step (c) is drowned in ice-water to precipitate the product.
10. The process of claim 1 wherein said metal salt of step (a) is antimony pentachloride, said cyclic imine is aziridine, said alkanolamine is N-methyl ethanolamine and said alkylene oxide is 1,4-butylene oxide.

References Cited
UNITED STATES PATENTS
3,352,916  11/1967  Zech.

CHARLES B. PARKER, Primary Examiner
RICHARD L. RAYMOND, Assistant Examiner

U.S. Cl. X.R.
260—239

UNITED STATES PATENT OFFICE
CERTIFICATE OF CORRECTION

Patent No. 3,531,527   Dated September 29, 1970

Inventor(s) Tsi Tieh Li, Guido Mino, Samuel Kaizerman

It is certified that error appears in the above-identified patent and that said Letters Patent are hereby corrected as shown below:

Column 4, line 19, "(0.058)" should read --(0.058 moles)-- as appears on page 6, line 18 of the original specification.

SIGNED AND SEALED
DEC 1 - 1970

(SEAL)
Attest:

Edward M. Fletcher, Jr.
Attesting Officer

WILLIAM E. SCHUYLER, JR.
Commissioner of Patents